United States Patent [19]

Baker et al.

[11] Patent Number: 5,513,538
[45] Date of Patent: May 7, 1996

[54] TEST CHAMBER WITH A PULL OUT TABLE THAT HAS A BRAKE AND STOPS THAT LIMIT THE MOVEMENT OF THE TABLE

[75] Inventors: Peter D. Baker, Aliso Viejo; Robert H. Weinmann, Jr., Laguna Hills; Robert Mercado, Lake Forest; Christopher W. Nesselroad, Lake Forest; Lucy A. Baker, Lake Forest; Gilbert J. Bastien, Corona, all of Calif.

[73] Assignee: Screening Systems, Inc., Laguna Hills, Calif.

[21] Appl. No.: 404,352

[22] Filed: Mar. 15, 1995

Related U.S. Application Data

[62] Division of Ser. No. 337,769, Nov. 14, 1994, abandoned.

[51] Int. Cl.⁶ .................... G01N 17/00; G01N 29/00; B06B 3/00
[52] U.S. Cl. .................................. 73/865.6; 73/663
[58] Field of Search ........................ 73/865.6, 571, 73/663, 665; 128/202.12, 205.26; 312/1; 422/104, 294, 295, 307; 52/573.1, 802, 803, 810; 70/92, 279; 292/92, DIG. 65, DIG. 71; 248/439; 108/177, 189

[56] References Cited

U.S. PATENT DOCUMENTS

| | | | |
|---|---|---|---|
| 670,858 | 3/1901 | Emerson | 52/803 |
| 2,348,574 | 5/1944 | Ross | 422/307 |
| 2,385,683 | 9/1945 | Burton | 128/202.12 |
| 2,862,584 | 12/1958 | allen | 52/573.1 |
| 3,286,412 | 11/1966 | Greig et al. | 52/810 |
| 3,664,181 | 5/1972 | Conrad et al. | 73/571 |
| 3,677,043 | 7/1972 | Cox | 70/92 |
| 3,877,427 | 4/1975 | Alexeev et al. | 128/205.26 |
| 4,230,107 | 10/1980 | Butler | 128/205.26 |
| 4,703,962 | 11/1987 | Kelly et al. | 292/DIG. 65 |
| 4,727,870 | 3/1988 | Krasle | 128/205.26 |
| 4,812,750 | 3/1989 | Keel et al. | 73/865.6 |
| 4,850,380 | 7/1989 | Koslow | 312/1 |
| 4,961,330 | 10/1990 | Evans | 70/92 |
| 5,348,704 | 9/1994 | Tanaka | 422/22 |

FOREIGN PATENT DOCUMENTS 1329539  9/1973  United Kingdom ............. 128/205.26

OTHER PUBLICATIONS

Tenney Engineering, Inc. "Tenney Environmental Test Equipment", Short Form Catalog, Sep. 1965.
Tenney Engineering, Inc. Aerospace Division, "Space Simulators", 31 Aug. 1961.

Primary Examiner—Hezron E. Williams
Assistant Examiner—Daniel S. Larkin
Attorney, Agent, or Firm—Blakely, Sokoloff Taylor & Zafman

[57] ABSTRACT

A testing apparatus which has a test chamber located within a chamber frame. The apparatus includes a computer controlled ergonomic system which can vary the temperature of the test chamber. Within the test chamber is an adjustable ceiling that can be moved to vary the volume of the chamber. Extending around the outer edge of the ceiling is an inflatable seal which seals the chamber when the ceiling is moved to a new position. The ceiling and walls have a plurality of adjustable vents that direct fluid flow into the chamber. The doors of the apparatus are each constructed from an inner wall that is coupled to an outer wall by a plurality of floating joints. The floating joints allow the inner wall to contract or expand relative to the outer wall without creating a corresponding stress on the outer wall or the joints. To prevent an operator from prematurely opening a door after temperature cycling, the door locks are computer controlled so that the doors cannot be unlocked until the test chamber reaches an operator safe condition. The computer also prevents the ceiling from being adjusted until the front doors are opened and the table is pulled out of the chamber. One door also has an override button that allows the operator to open the door from the inside of the test chamber. Additionally, the testing apparatus includes a vibration table which can be pulled to a position outside of the test chamber. The table has a brake and shock absorbers that prevent an undesirable shock to the test parts when moving the table into and out of the test chamber.

14 Claims, 11 Drawing Sheets

TEST CHAMBER WITH A PULL OUT TABLE THAT HAS A BRAKE AND STOPS THAT LIMIT THE MOVEMENT OF THE TABLE

This is a divisional of application Ser. No. 08/337,769, filed Nov. 14, 1994, now abandoned.

BACKGROUND OF THE INVENTION

1. Field of the Invention

The present invention relates to a test chamber that can perform thermal and vibrational test on an object located within the chamber.

2. Description of Related Art

It is often desirable to test a component or assembly under simulated environmental conditions. For example, prototype electronic assemblies are exposed to various temperature, vibration and shock loads to determine whether the assembly can operate within its intended environment. Environmental testing is typically performed within a test chamber that is coupled to an ergonomic system which can vary the temperature and humidity within the chamber. The size of the test part can vary considerably, ranging from a large aircraft component to a small semiconductive device. The test chamber must be large enough to accommodate all types of test parts.

Using a large test chamber creates a relatively significant mass of air within the chamber. When temperature cycling a test part, the large air mass and inner chamber surfaces create a significant thermal inertia which must be overcome by the ergonomic system, resulting in additional work for the system and limiting the response time of the chamber. Some test chambers incorporate partition walls that reduce the volume of the test chamber. Assembling and disassembling the partition walls requires valuable testing time. It therefore would be desirable to provide an automated variable volume test chamber.

Thermal cycling a test part within a test chamber may result in a temperature differential between the test chamber and the room of more than 100° C. A large temperature differential may cause the inner walls of the test chamber to expand or contract an amount different than the outer walls of the test chamber. In particular, if the inner chamber is at a sub-zero temperature the inner wall of the door will contract more than the outer wall of the door. It has been found that extreme thermal contractions/expansions of the inner wall will warp the door and break the seal between the chamber and the door. A thermal cycle of the door may also cause the door fasteners to fail. It would be desirable to have a test chamber door that will not warp or become damaged when subjected to thermal cycling.

After a part is tested, it is removed from the test chamber. It has been found that the operator may become injured or the test part may become damaged, if the test chamber is opened before the test is complete. For example, the operator may become burned if he enters the test chamber while at an elevated temperature. Likewise, opening the test chamber at a subzero temperature may result in condensation forming on, or within the test part and damaging the same. It would be desirable to provide a test chamber unit which does not allow the access door to be opened before the chamber reaches an operator "safe" condition. Additionally, it would also be desirable to allow an operator to open the access.door from within the test chamber in the event the operator becomes locked in the chamber.

To apply vibration and shock loadinG, the test parts are typically mounted to a vibration table located within the test chamber. Because of the limited space of a test chamber, it can be difficult to mount the test part onto the table within the chamber. Therefore it would be desirable to provide a vibration table that can be pulled to a position outside of the test chamber.

SUMMARY OF THE INVENTION

The present invention is a testing apparatus which has a test chamber located within a cheer free. The apparatus includes a computer controlled ergonomic system which can vary the temperature of the test cheer. Within the test chamber is an adjustable ceiling that can be moved to vary the volume of the chamber. Extending around the outer edge of the ceiling is an inflatable seal which seals against the chamber when the ceiling is located at one of its positions and the doors are closed. The ceiling and walls have a plurality of adjustable vents that direct conditioned air into the chamber. The doors of the apparatus are each constructed from an inner wall that is coupled to an outer wall by a plurality of floating joints. The floating joints allow the inner wall to contract or expand relative to the outer wall without creating a corresponding stress on the outer wall or the joints. To prevent an operator from prematurely opening a door after temperature cycling, the door locks are computer controlled so that the doors cannot be unlocked until the test chamber reaches an operator "safe" condition. The computer also prevents the ceiling position from being adjusted until the front doors are opened and the table is pulled out of the chamber. One front door also has an override button that allows the operator to open the door from the inside of the test chamber. Additionally, the testing apparatus includes a vibration table which can be pulled to a position outside of the test chamber. The table has a brake and shock absorbers that prevent an undesirable shock to the test parts when moving the table into and out of the test chamber.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
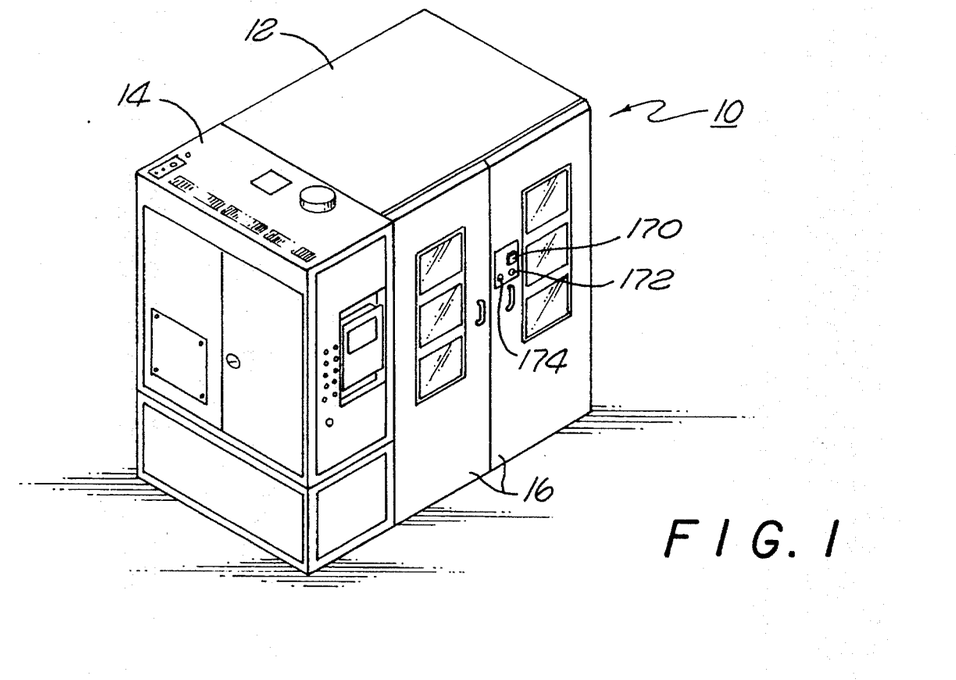
FIG. 1 is a perspective view of a testing apparatus of the present invention.
Figure 1A:
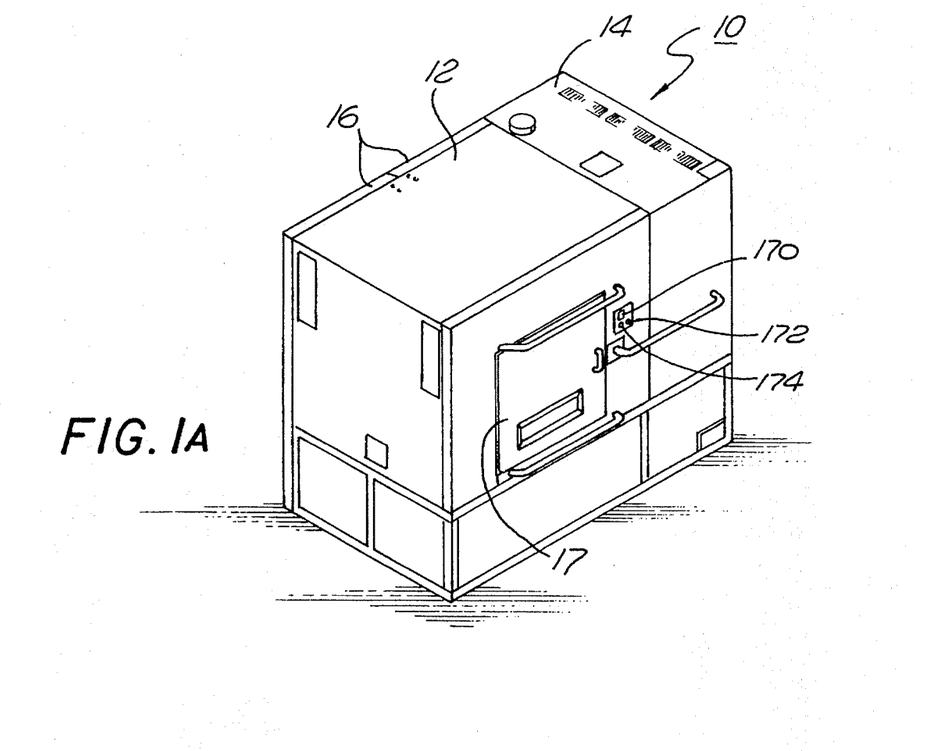
FIG. 1a is a rear perspective view of the test apparatus.

Referring to the drawings more particularly by reference numbers, FIGS. 1 and 1a show a testing apparatus 10 of the present invention. The testing apparatus 10 includes a test housing 12 and an ergonomic system console 14. The housing 12 has a pair of front doors 16 and a rear door 17 which provide access to a test chamber. The ergonomic system 14 contains a computer and other components required to perform various environmental tests within the test chamber of the housing 12. For example, the ergonomic system 14 may contain heating and cooling components that raise and lower the temperature within the test chamber. The system 14 may also have equipment to increase and decrease the humidity of the test chamber.

Figure 2:
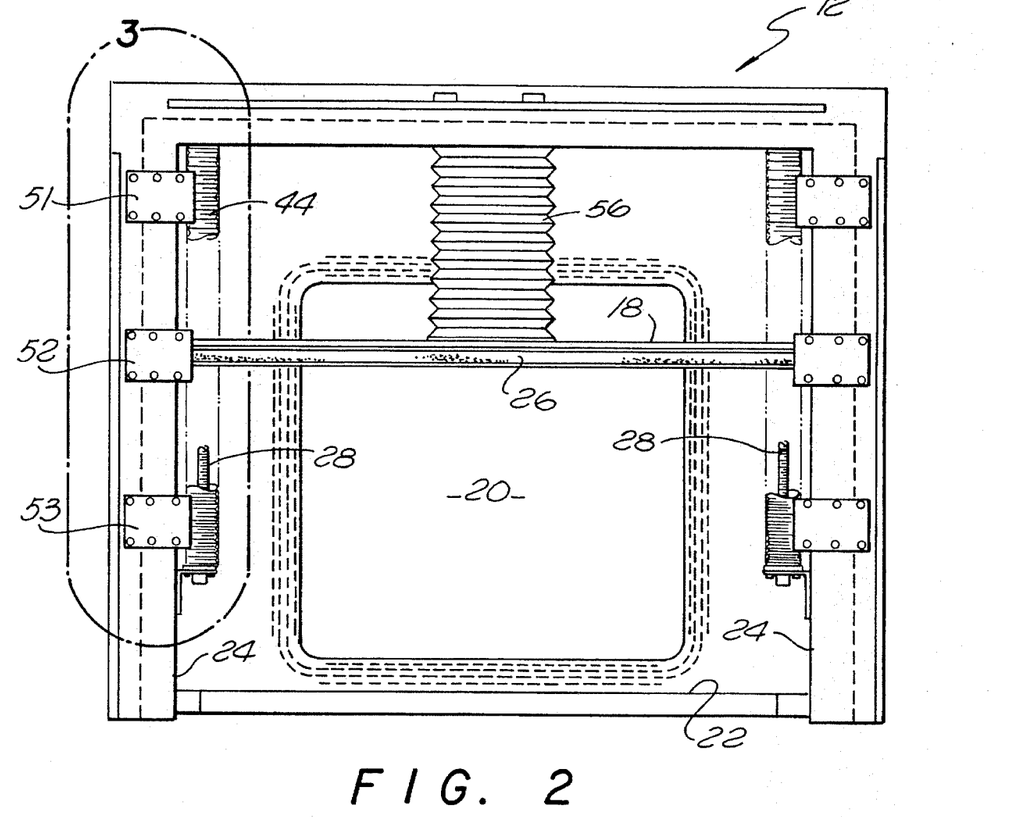
FIG. 2 is a cross-sectional view of the test chamber showing an adjustable ceiling.

As shown in FIG. 2 the housing 12 has an adjustable ceiling 18 located within the test chamber 20. The ceiling 18 can move relative to the floor 22 and walls 24 of the housing to vary the volume of the test chamber 20. The floor 22 may be a vibration table. The apparatus is capable of simultaneously vibrating a test part and varying the temperature within the chamber. The computer typically controls the movement of the ceiling 18. In the preferred embodiment, the ceiling 18 will not move until the front doors are opened and the vibration table is pulled out of the chamber. The doors and table may have switches that provide the computer with feedback signals when the front doors are open and the table is pulled out of the test chamber.

Figure 2A:
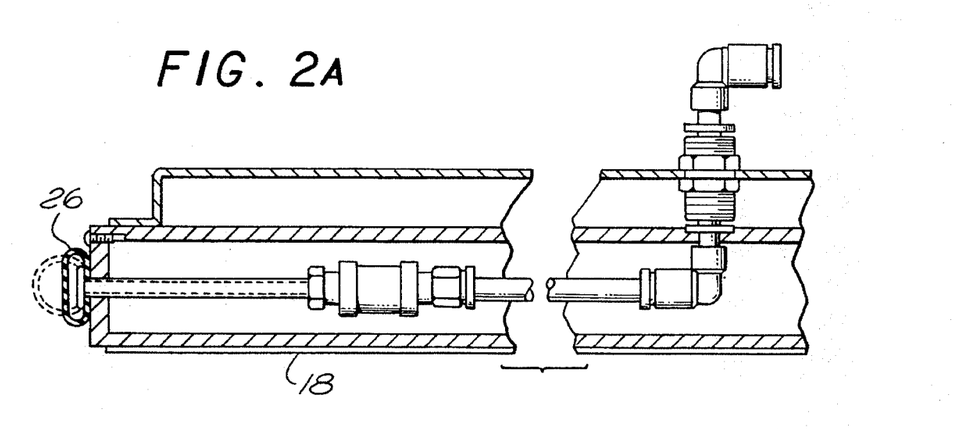
FIG. 2a is a cross-sectional view of the ceiling seal.

As shown in FIG. 2a, extending around the outer edge of the ceiling 18 is an inflatable seal 26. The seal 26 is typically constructed from silicone and coupled to a source of pressurized air. The seal 26 is deflated before the ceiling 18 is moved and inflated when the ceiling 18 reaches a new position and the doors 16–17 are closed. The housing 12 may have a valve (not shown) that automatically controls the flow of air into and out of the seal 26. The doors 16–17 may also have inflatable seals (not shown) that expand when the doors 16–17 are closed and deflate before the doors 16–17 are opened.

Figure 3:
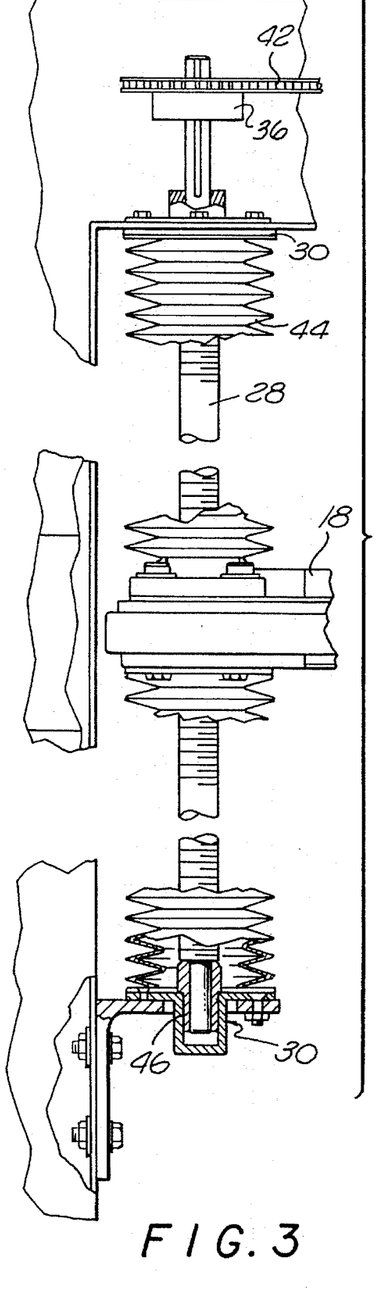
FIG. 3 is an enlarged view of a jack screw assembly.
Figure 4:
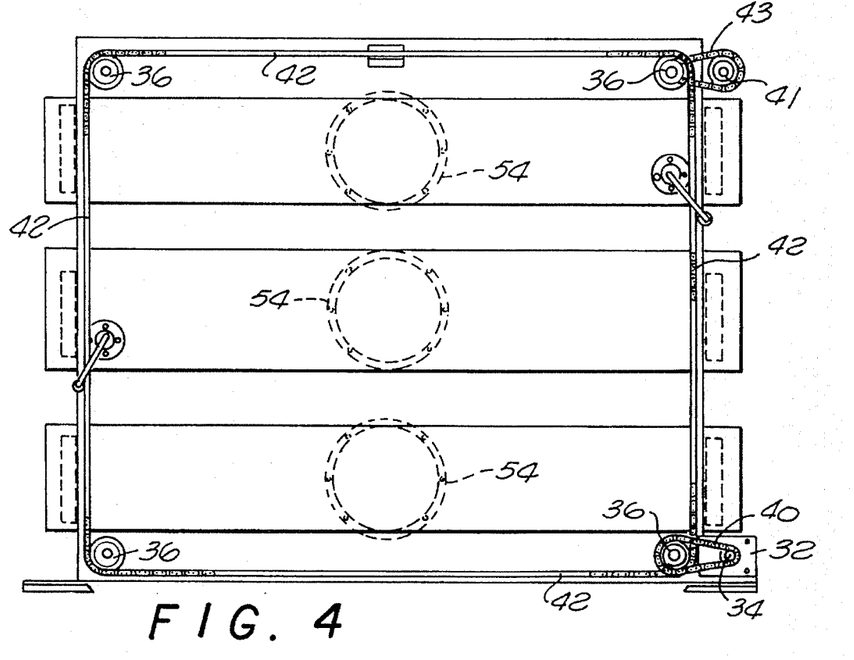
FIG. 4 is a top sectional view of a test chamber ceiling.

As shown in FIG. 3, the ceiling 18 is coupled to a number of jack screws 28 that are mounted to flanges 30. The ceiling 18 has internal threads that cooperate with the jack screws 28 to move the ceiling when the screws 28 are rotated. As shown in FIG. 4, the jack screws 28 are rotated by a reversible electric motor 32. The motor 32 is coupled to the screws 28 by gears 34 and 36 and chains 40 and 42. Each jack screw 28 may have a pair of outer flexible boots 44 that prevent contaminants from affecting the operation of the screws 28. Each jack screw 28 may also have a bearing 46 that couples the end of the screw 28 to the flange 30.

Figure 5:
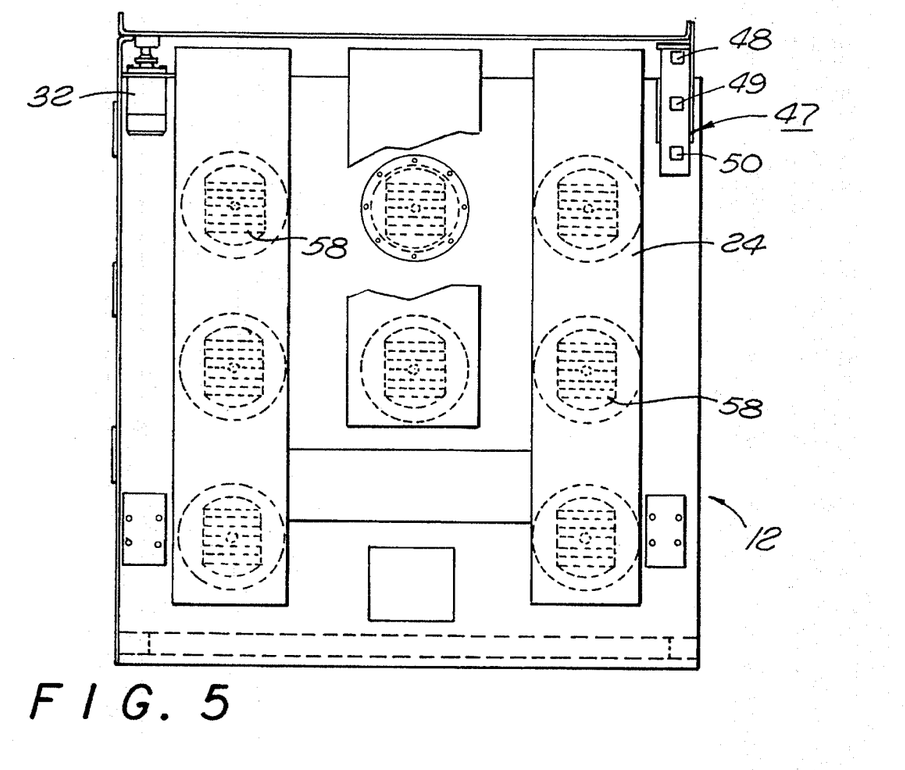
FIG. 5 is a side view of an inner wall of the test chamber.

As shown in FIG. 5, the housing 12 may have a sensor assembly 47 that contains a plurality of position sensors 48–50 that provide feedback signals when the ceiling is adjacent to one of the corner seals 51–53 shown in FIG. 2. Referring to FIGS. 4 and 5, the sensor assembly 47 is coupled to one of the jack screws 28 by gears 36 and 41, and chain 43. The feedback signal is typically provided to the computer of the ergonomic system 14 which also controls the operation of the electric motor 32 and the air valve of the seal 26. The console 14 may allow the operator to remotely move the ceiling to one of a plurality of locations within the test chamber. By way of example, the third sensor 50 may correspond to a small chamber, the second sensor 49 may correspond to an intermediate chamber and the first sensor 48 may correspond to the ceiling position of a large chamber.

If the operator selects the intermediate chamber, the computer will determine the present position of the ceiling based on the feedback signals of the sensors 48–50. The seal 26 is deflated and the electric motor 32 is energized to rotate the jack screws 28 and move the ceiling 18. The screw 28 rotation continues until the ceiling reaches the second sensor 49. When the ceiling is in position, the second sensor 49 provides a feedback signal to the computer which de-energizes the electric motor 32 and inflates the seal 26 when the doors 16–17 are closed.

Figure 4A:
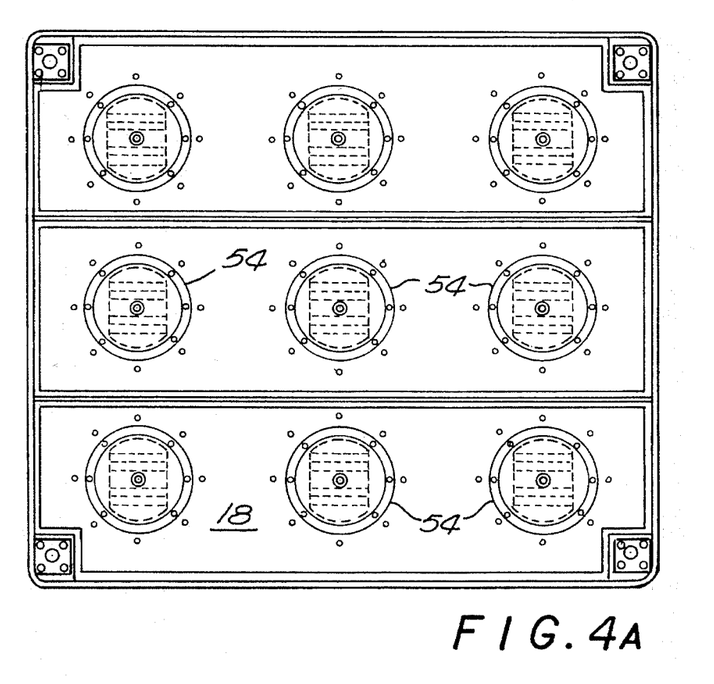
FIG. 4a is a top sectional.view of the adjustable ceiling.

As shown in FIG. 4a, the ceiling 18 typically has 9 ducts 54. Six of the ducts 54 typically provide conditioned air, while the remaining ducts 54 provide a return path from the test chamber. Referring to FIG. 2, the ducts 54 are coupled to the ergonomic system by bellows 56. The bellows 56 provide flexible ducts for the ceiling 18. As shown in FIG. 5, the walls have a plurality of vents 58. The vents 58 are located within the walls 24 so that fluid flow can occur into the test chamber when the ceiling is in the low, intermediate and high positions. The vents 58 are also arranged so that a partition wall (not shown) can be attached to the ceiling 18 to further reduce the volume of the test chamber 20.

Figure 6:
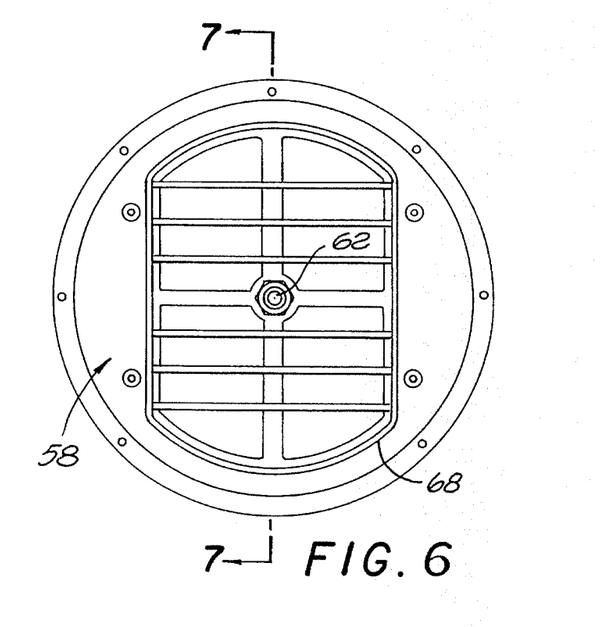
FIG. 6 is a front view of a vent.
Figure 7:
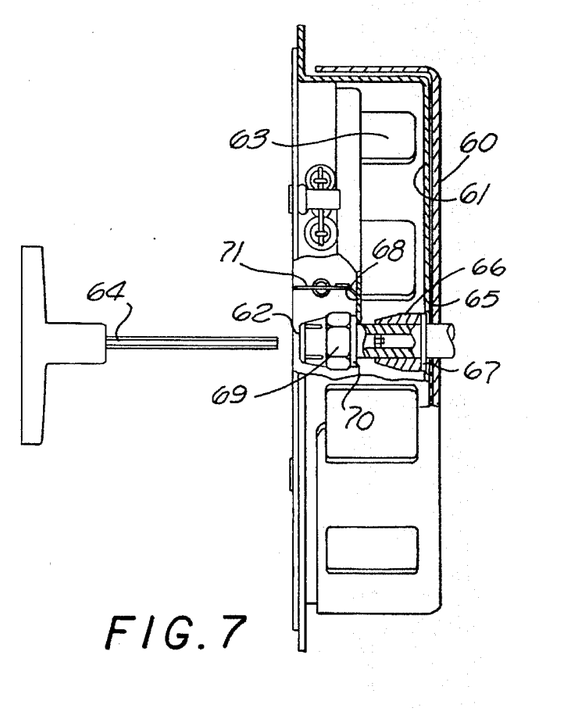
FIG. 7 is a cross-sectional view of the vent of FIG. 6.
Figure 7A:
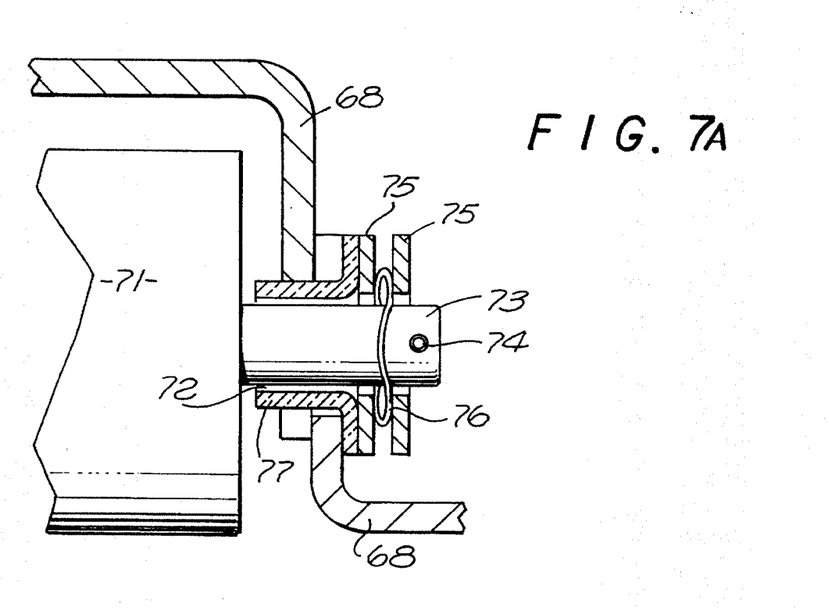
FIG. 7a is an enlarged view of a vent vane end tab attachment.

FIGS. 6, 7 and 7a show a preferred embodiment of the vents 58. The vents 58 each have a throttle plate 60 coupled to a housing 61 by a set screw 62. Both the throttle plate 60 and the main housing 61 have slots 63 that regulate air flow between an ergonomic duct (not shown) and the test chamber. The throttle plate 60 can be rotated by a tool 64 that is inserted into an allen cup in the set screw 62. Rotating the throttle plate 60 varies the alignment of the slots 63 between the housing 61 and the plate 60, and the flow into the chamber. The plate 60 may be separated from the housing 61 by a Teflon washer 65 and clamped together by a nut 66 and a wavy spring 67.

Figure 8:
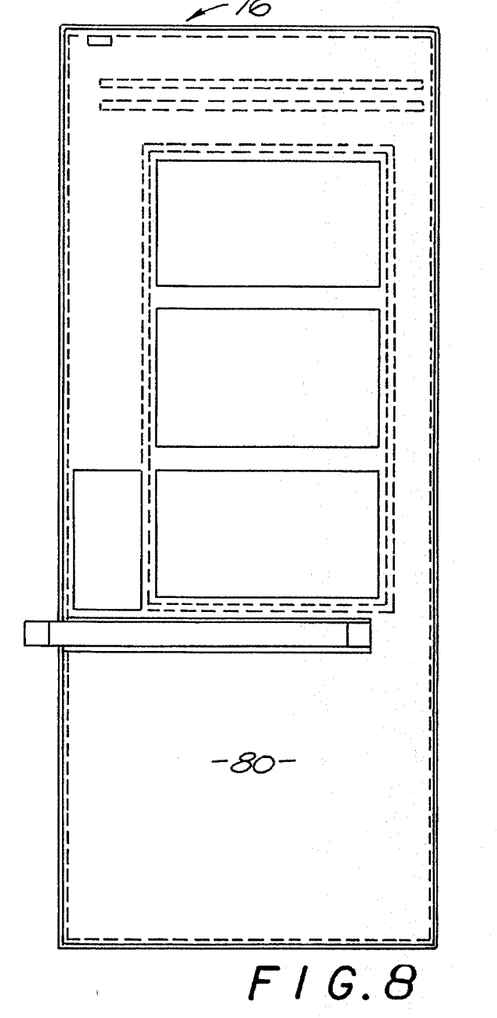
FIG. 8 is a rear view of an inner wall of the door.
Figure 9:
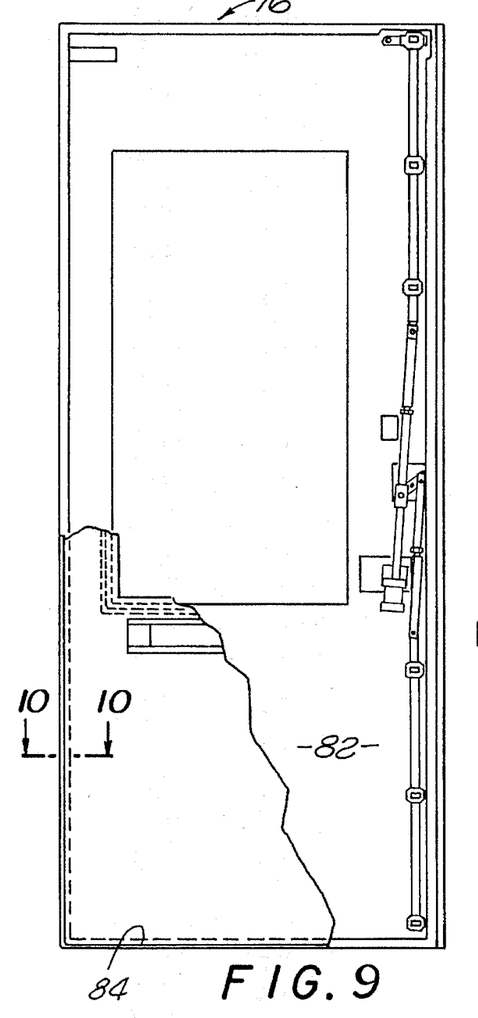
FIG. 9 is a rear view of an outer wall of the door.
Figure 10:
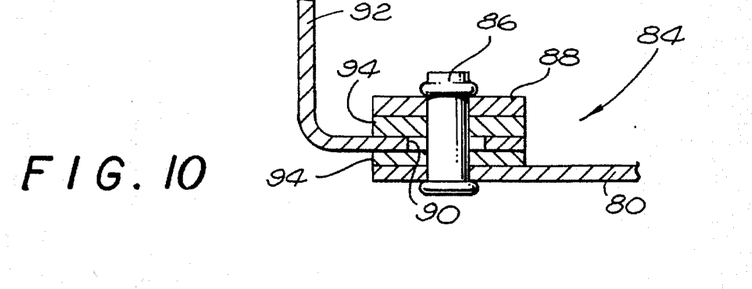
FIG. 10 is an enlarged view of a rivet joint.

Each vent 58 may also have a vane plate 68 that is coupled to the set screw 62 by nut 69 and spring 70. Coupled to the vane plate 68 are a plurality of vanes 71. As shown in FIG. 7a, the vane plate 68 is typically constructed from two separate pieces that overlap to create openings 72 which receive outer tabs 73 of the vanes 71. The vane tabs 73 each have a roll pin 74 that presses the vane 71 into a pair of washers 75 and a wavy spring 76. The washer/spring assembly presses into a bushing 77 that extends into the opening 72. The wavy spring 76 provides a force that maintains the position of the vane 71. Each vane can be individually rotated to provide directional air flow control into the test chamber. Additionally, the vane plate 68 can be rotated relative to the housing 61 to change the direction of fluid flow. As shown in FIGS. 8–10 the access doors 16 each have an outer wall 82 and an inner wall 80. The walls are joined together by a plurality of flexible joints 84 located about the door. The flexible joints 84 each contain a rivet 86 that is attached to the inner wall 80 and an inner fastener member 88. The rivet 86 extends through a clearance hole 90 of an outer wall flange 92. The flange 92 is separated from the inner wall 80 and the fastener member 88 by a pair of washer members 94. The rivet 86 squeezes the outer wall flange 92 between the inner wall 80 and the fastener member 88, thereby attaching the outer wall 82 to the inner wall 80.

A change in temperature within the test chamber will cause the inner wall 80 to either expand or contract. The clearance hole 90 of the outer wall flange 92 allows the inner wall 80 to move relative to the outer wall 82. The relative wall movement eliminates warpage of the inner wall 80, the outer wall 82 and stress on the rivets 86.

Figure 11:
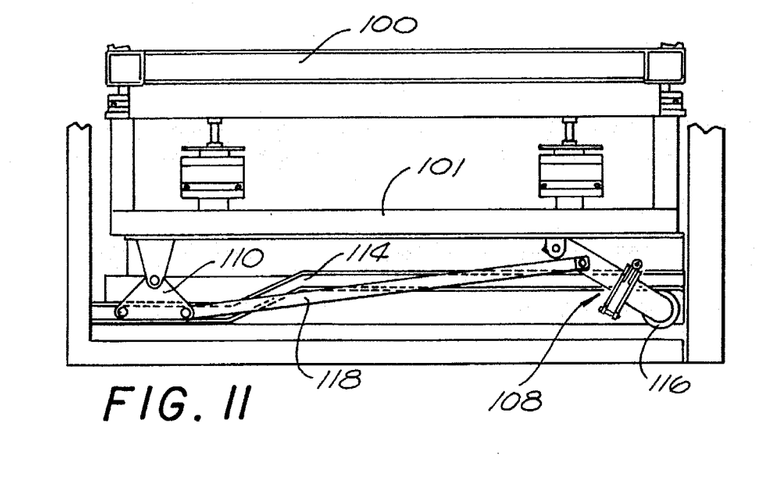
FIG. 11 is a cross-sectional view of a table.
Figure 12:
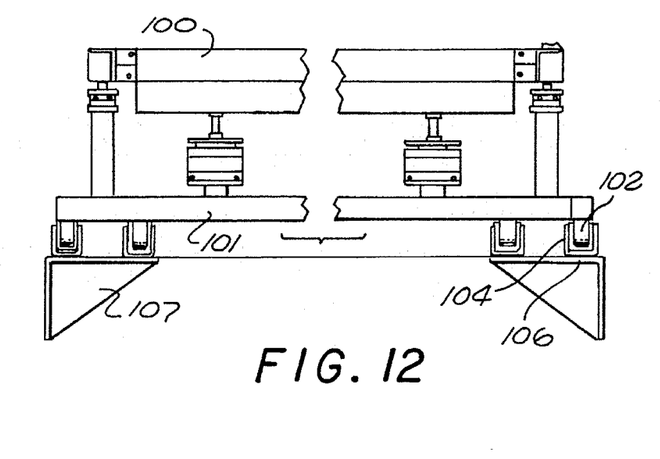
FIG. 12 is an end view of the table.
Figure 13:
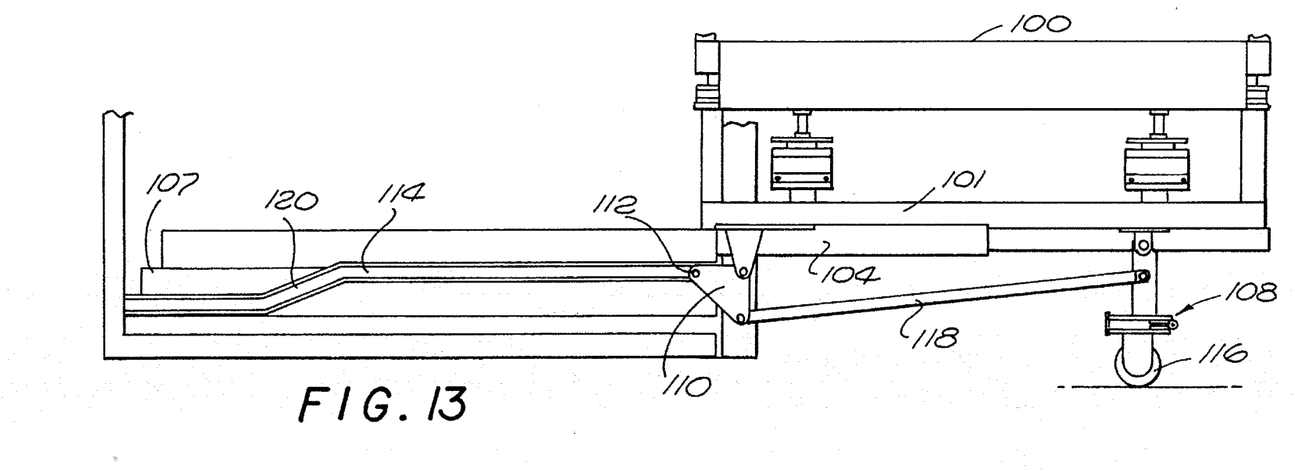
FIG. 13 is a view similar to FIG. 11 showing the table pulled out of a test chamber.

As shown in FIGS. 11–13, the testing apparatus includes a vibration table 100. The vibration table 100 is mounted to a table support assembly 101. The test parts are typically mounted to the vibration table 100. To make the vibration table 100 more accessible to the operator, the support assembly 101 is constructed to be pulled out of the test chamber. The support assembly 101 has a plurality of rollers 102 that slide within two pairs of telescopic channels 104 located on slide supports 106 that are part of a table base 107 mounted to the chamber frame. The slides have a stop that prevents the table from being detached from the housing.

The support assembly 101 also has a retractable wheel assembly 108. The wheel assembly 108 includes a follower 110 that is pivotally connected to the assembly 101. The follower 110 has a roller 112 which moves along a track 114. The follower 110 is also connected to two wheels 116 by linkage bar 118. The wheels 116 are pivotally connected to the support assembly 101. The track 114 has a step 120 that moves the roller 112 in an upward direction when the table 100 and support assembly 101 are pulled out of the test cheer. The upward movement of the slide 112 induces a clockwise rotation of the follower 110 so that the linkage arm 118 pulls the wheels 116 down. Pushing the table 100 and support assembly 101 back into the test chamber generates a counterclockwise rotation of the follower 110 and a corresponding upward movement of the wheels 116.

Figure 14:
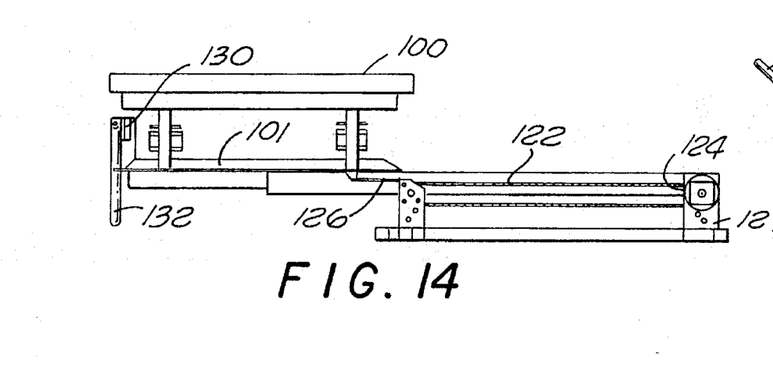
FIG. 14 is a side view of the table with a handle in a vertical position.
Figure 15:
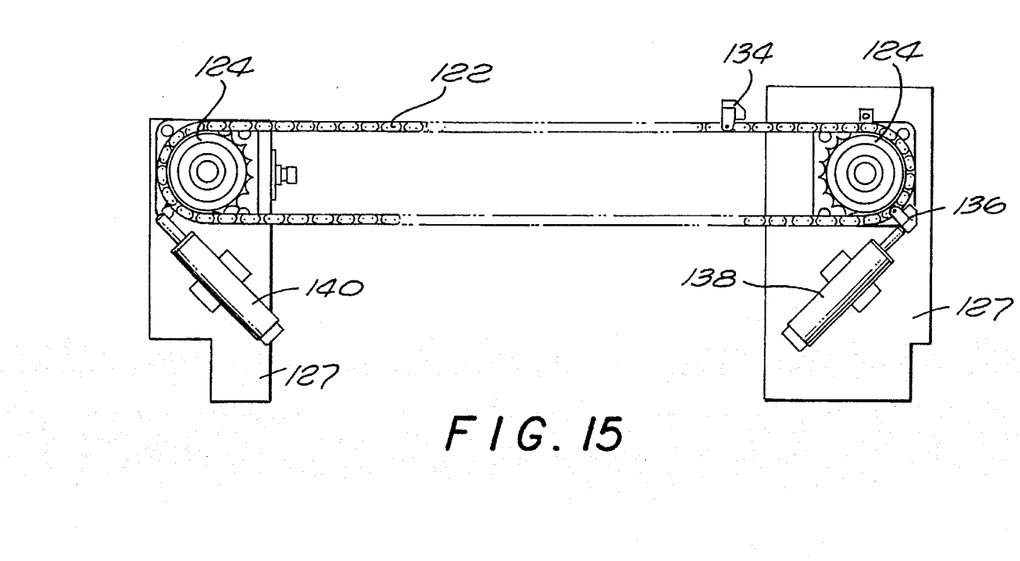
FIG. 15 is a side view of a brake assembly of the table.
Figure 16:
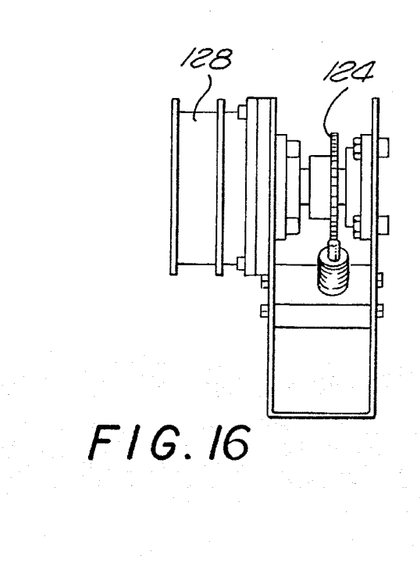
FIG. 16 is an enlarged end view of the brake assembly.

As shown in FIGS. 14 and 15, the support assembly 101 is coupled to a chain belt 122 that is coupled to a pair of sprockets 124 by an attachment link 126. The sprockets 124 are mounted to support brackets 127 that are attached to the chamber frame. Movement of the table 100 and assembly 101 rotate the chain 122 about the sprockets 124. As shown in FIG. 16, one of the sprockets 124 is coupled to a brake 128. The brake 128 has a spring biased electronic clutch (not shown) that normally holds the sprocket 124 and prevents the table 100 from moving relative to the brackets 127. Referring to FIG. 14, the table has a switch 130 that is connected to the electronic clutch of the brake 128. The switch 130 is activated by movement of a handle 132 that is used to move the table 100 and the assembly 101. When the handle 132 is in a vertical position, the switch 130 is open and the brake 128 prevents movement of the table 100 and assembly 101.

Figure 17:
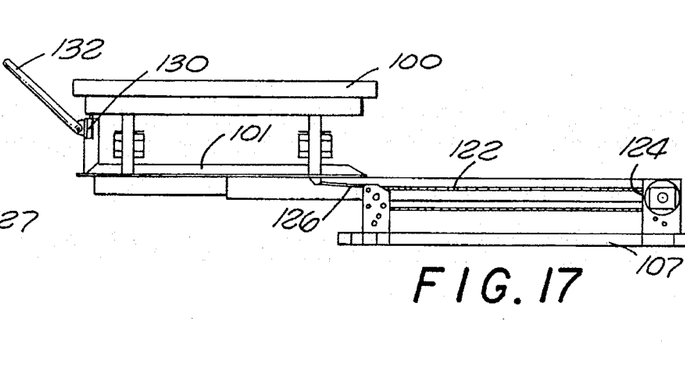
FIG. 17 is a view similar to FIG. 14 showing the handle rotated.

As shown in FIG. 17, when the handle 132 is rotated, the switch 130 is closed and the brake 128 is disengaged. Disengaging the brake 128 allows the sprockets 124 to freely rotate and the table 100 to move relative to the base 107. The switch 130 and brake 128 provide a safety feature for the table 100, wherein the table 100 will not move unless the operator is holding a rotated handle 132. For example, if the operator is pushing the table 100 into the test chamber and inadvertently releases the handle 132, without the brake 128, the table would roll into the chamber and bump into the stops to produce an undesirable shock load on the test parts. When the push handle 132 of the present invention is released, the brake 128 will smoothly decelerate the table 100 and thereby prevent possible damage to the test parts and possibly the operator.

As shown in FIG. 15, the chain 122 has a pair of stops 134 and 136 that engage corresponding shock absorbers 138 and 140 located adjacent to the sprockets 124. When the table 100 is pulled out of the test chamber, the stop 134 engages shock absorber 140 which reduces the velocity of the table 100. Likewise when the table 100 is pushed back into the test chamber the stop 136 engages shock absorber 138 to slow down the table 100.

Figures 18, 20:
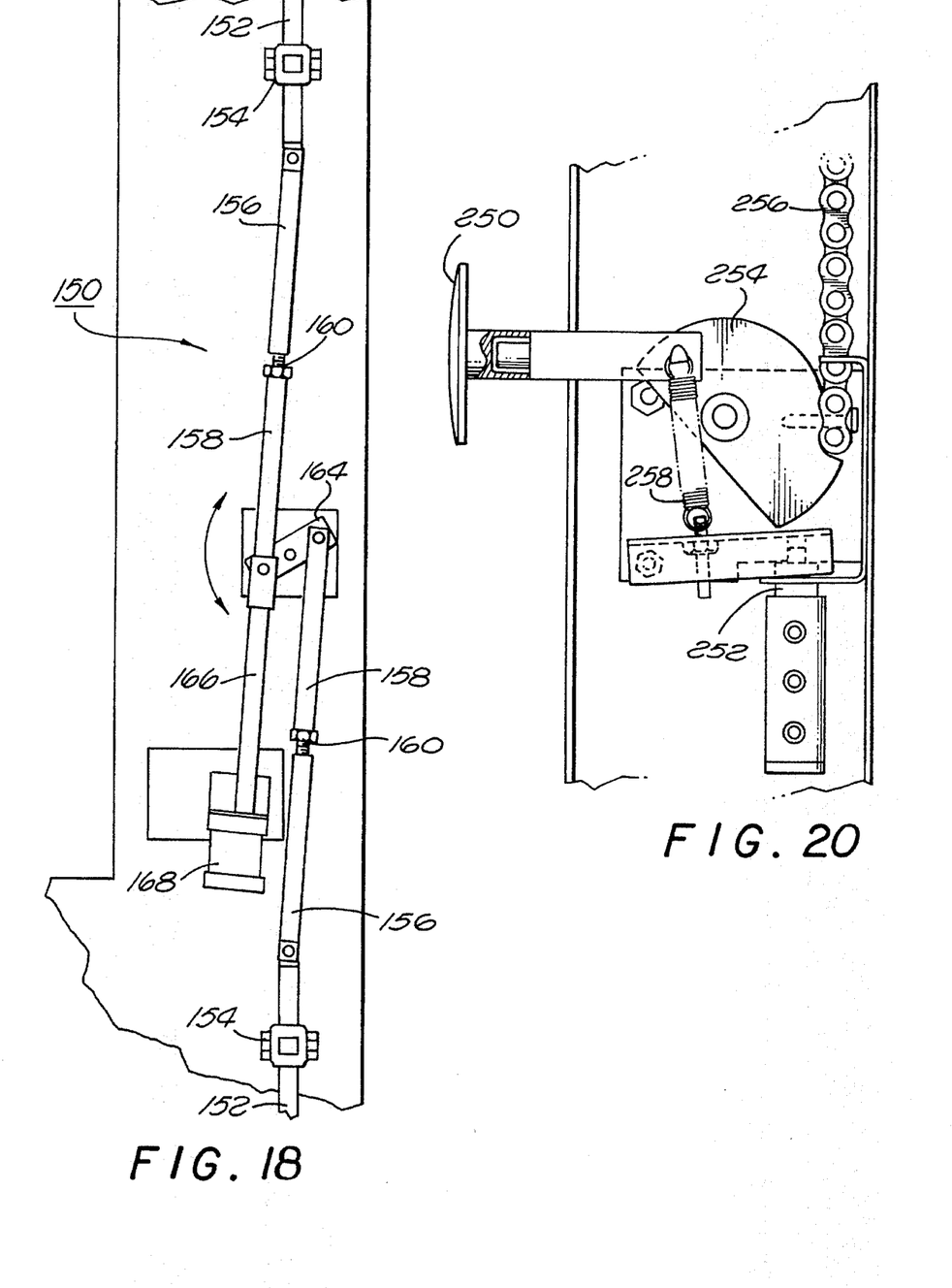
FIG. 18 is a side view of an automatic door locking assembly.
FIG. 20 is a side view of an emergency door button that can be operated from the inside of the test chamber.

As shown in FIG. 18, the testing apparatus may include an automatic door locking assembly 150. Each of the access doors 16–17 typically contain a locking assembly 150.

The locking assembly 150 has a pair of locking pins 152 located at the top and bottom portions of the door. The locking pins 152 are coupled to corresponding slots (not shown) in the test chamber frame to lock the doors. The pins 152 are guided by guide bushings 154. The guide bushings 154 are typically constructed from a low friction material such as acetal resin. The locking pins 152 are pivotally connected to a pair of first linkage arms 156. The first linkage arms 156 are coupled to a pair of second linkage arms 158 by threaded joints 160. The length of the overall assembly 150 can be adjusted by rotating the threaded joints 160. The second linkage arms 158 are connected to a rotating plate 164 that is coupled to the output shaft 166 of an actuator 168. The actuator 168 is controlled by a control valve (not shown) that is connected to the computer of the ergonomic system 14.

In the preferred embodiment, the actuator 168 is a spring return two-way pneumatic cylinder that can move the locking pins 152 between the locked and unlocked positions. The control valve is typically a spring return solenoid valve that controls the flow of air into the actuator. When the solenoid is energized by the computer, the valve is opened and the actuator 168 pulls the locking pins 152 into the unlocked position. De-energizing the solenoid reverses the flow of air to the actuator 168 and forces the output shaft 166 and locking pins 152 to the locked position. The internal actuator spring will maintain the output shaft 166 and the locking pins 152 in the locked position if the air pressure to the actuator is lost.

Referring to FIGS. 1 and 1a, an access door 16 and the housing 12 may have a pair of lights 170 and 172 and a single button 174. One of the lights 170 illuminates a red color which provides an indication that the chamber cannot be entered. The other light 172 illuminates a green color which provides an indication that the chamber can be entered. Depressing a button 174 will unlock the doors when the chamber is safe to enter. When a button 174 is depressed, the computer is programmed to stop the test being performed within the chamber and note where the test was terminated. The ergonomic system will change the temperature of the inner chamber to an operator "safe" condition. Additionally, when performing thermal testing the chamber is typically filled with nitrogen gas. The computer is programmed to purge the nitrogen and fill the test chamber with ambient air before the access doors can be opened. After purging the test chamber with air, the computer is programmed to deflate the seals and unlock the doors. The test chamber may contain microswitches that detect when the doors are opened and provide a feedback signal to the computer to indicate the same.

Figure 19A:
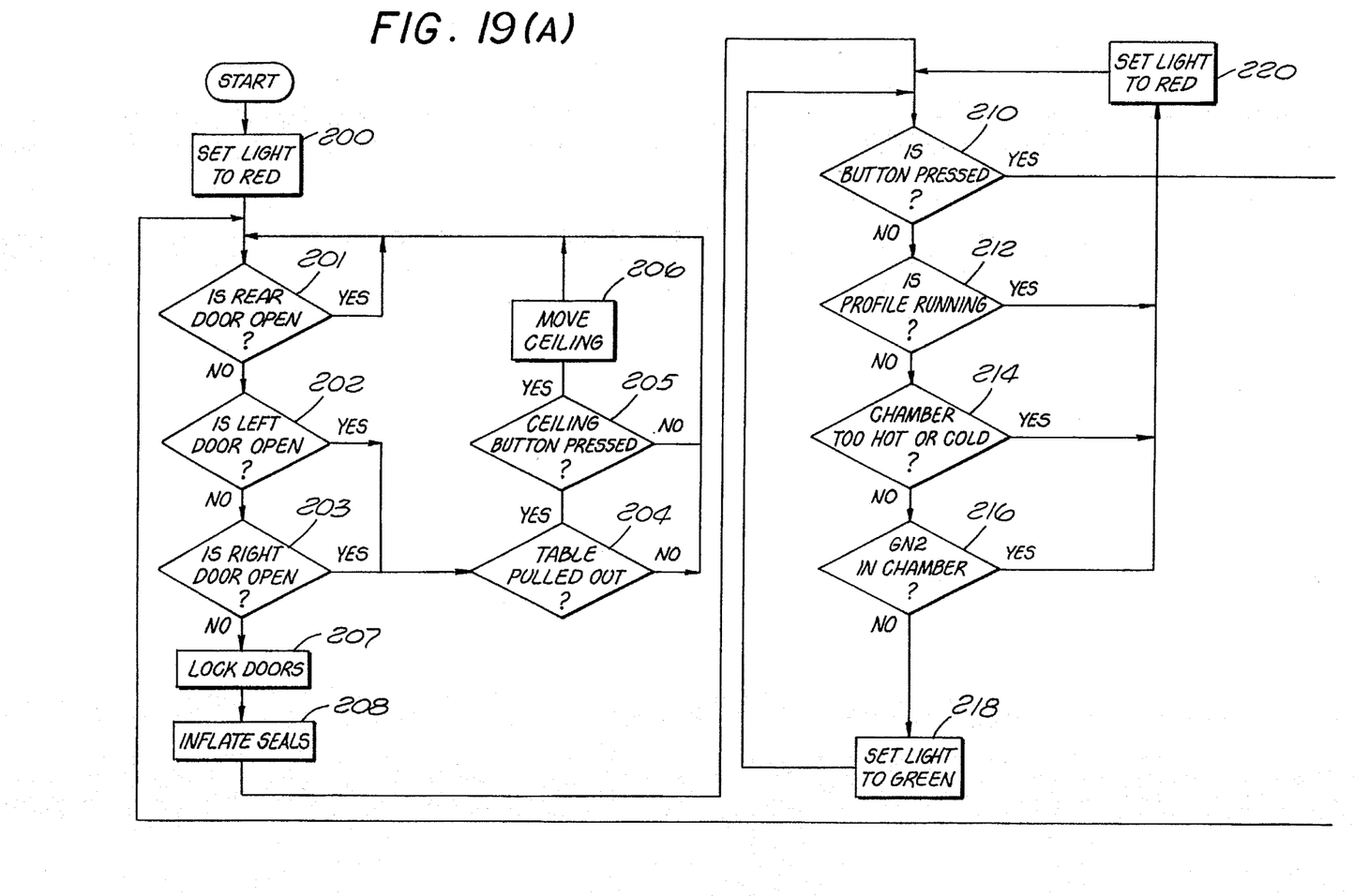
FIGS. 19a and 19b are flowcharts showing a routine for performing a test and opening the doors of the test apparatus.
Figure 19B:
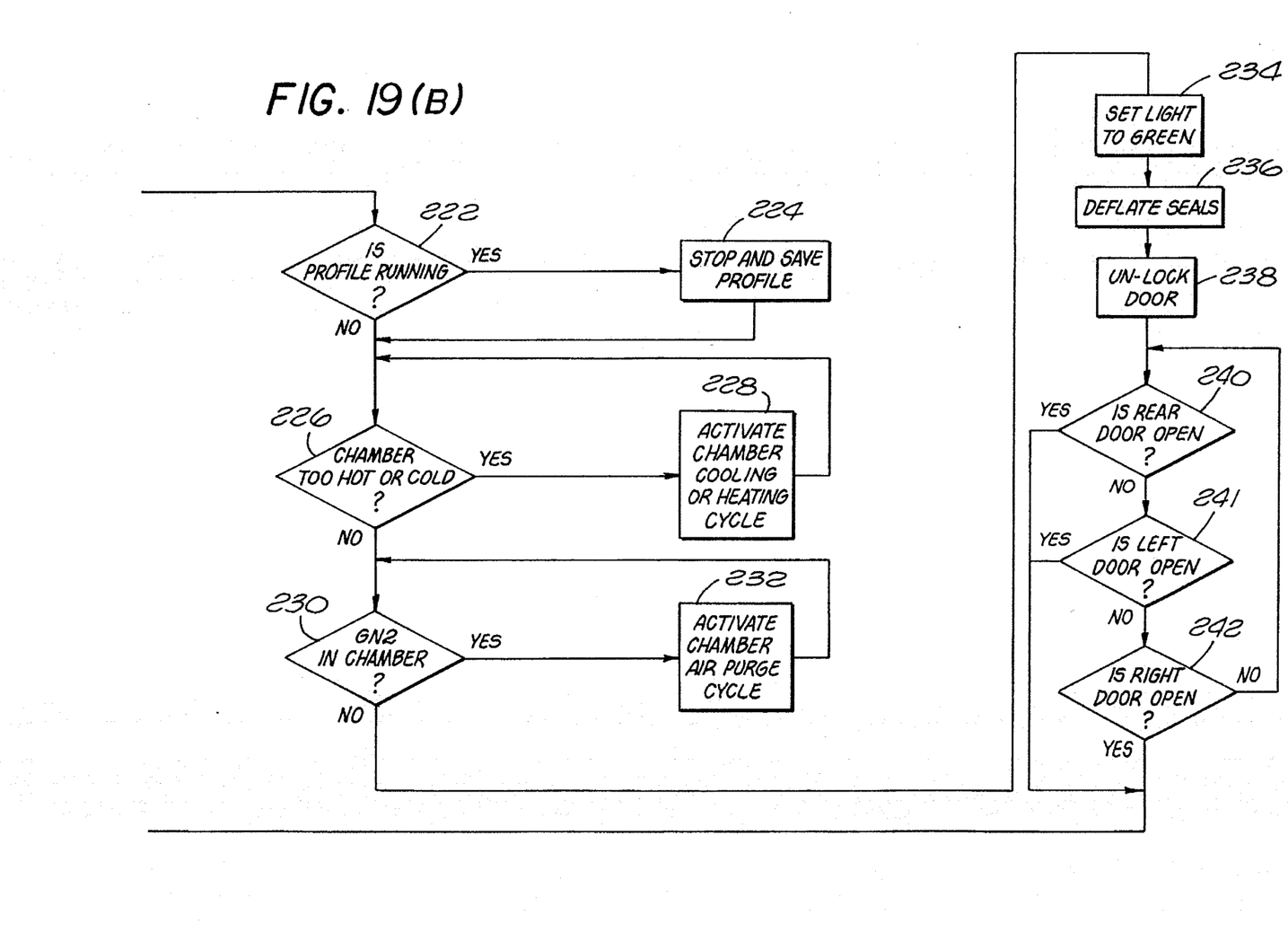

FIGS. 19A and 19B show a flowchart of a routine typically performed by the computer and the test apparatus when performing a test. The routine depicted can be performed by either hardware or software within the computer. The access doors are closed by the operator and the red light is illuminated in processing block 200. The microswitches are sensed to determine whether the doors are closed in decision blocks 201–203. If the front doors 16 are open, the computer determines whether the table 100 has been pulled out and the ceiling button (not shown) of the console has been depressed in decision blocks 204 and 205. If both of these conditions have been met, the computer moves the ceiling in processing block 206. If the doors are closed, the computer locks the doors and inflates the seals in processing blocks 207 and 208, respectively.

The computer senses whether a button 174 has been pushed by the operator in decision block 210. If the button has not been depressed, the chamber sensors and the computer programmed algorithms determine, whether a profile is running, the chamber is at an operator "safe" temperature and whether an unsafe level of nitrogen is in the chamber, in decision blocks 212, 214 and 216, respectively. If the results of the decision block are negative, the computer illuminates the green light in block 218. The green light provides an indication to the operator that although the doors are closed, the test chamber is safe to enter. If the test chamber is not operator "safe", the computer turns on the red light in block 220.

If a button 174 is depressed, the computer programmed algorithms determine if a profile is running in decision block 222 as shown in 19B. A running test is stopped and the profile is saved in the memory of the computer in block 224. The computer will be programmed to determine if the chamber is within predetermined temperature limits in decision block 226. If the temperature of the test chamber is outside acceptable limits, the ergonomic system will adjust the temperature in processing blocks 228. The computer will also control the level of nitrogen in the test chamber by determining whether the chamber contains too much nitrogen in decision block 230, and purging the chamber with air in block 232.

Once the test chamber is set to safe conditions, the green light is illuminated, the seals are deflated and the doors are unlocked in processing block 234, 236 and 238, respectively. The doors 16–17 are then opened by the operator, an event that is sensed by the computer in decision blocks 240–242.

As shown in FIG. 20, the test apparatus may have an override button 250 that allows an operator to exit the test chamber from inside the chamber. The button 250 is coupled to a plunger 252 which can switch the actuator 168 so that the output shaft 166 and locking pins 152 move into the unlocked position. The button 250 is coupled to the plunger 252 by cam 254 which is pivotally attached to the door 16. In the event the test chamber has no compressed air or electricity, the button 250 may also be coupled to a manual override assembly that unlocks the door. The override assembly includes the cam 254 that is pivotally attached to the door 16 and the button 250. Fastened to the cam 254 is a chain 256 that is coupled to the rotating plate 164 of the lock assembly. Pushing the button 250 further will rotate the cam 254, pull the chain 256 and move the locking pins 152 into the unlocked position. The override assembly may have a spring 258 that returns the cam 254 when the button 250 is released. The automatic lock and override system increase the safety of the test apparatus for the operator.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A test chamber, comprising:
   a housing that contains an inner chamber;
   a table located within said inner chamber and coupled to said housing so that said table can be pulled out of said housing;
   a brake that is coupled to said table, said brake prevents movement of said table when engaged and allows movement of said table when disengaged; and,
   a handle that can be moved between a first position which engages said brake and a second position which disengages said brake.

2. The test chamber as recited in claim 1, further comprising a stop that prevents said table from being detached from said housing.

3. The test chamber as recited in claim 1, further comprising a retractable wheel that supports said table when said table is pulled out of said inner chamber.

4. The test chamber as recited in claim 3, wherein said table has a follower that cooperates with a track.

5. The test chamber as recited in claim 4, wherein said follower is coupled to said wheel by a linkage arm, said track has a step that rotates said follower and moves said wheel between retracted and extended positions.

6. The test chamber as recited in claim 1, wherein said housing includes a door that provides access to said inner chamber, said door having a lock that can be operated from within said inner chamber.

7. The test chamber as recited in claim 6, wherein said lock is coupled to a computer that maintains said lock in a closed position until said inner chamber is in a safe condition.

8. A test chamber, comprising:
   a housing that contains an inner chamber;
   a track located within said inner chamber;
   a table located within said inner chamber and coupled to said housing so that said table can be pulled out of said housing;
   a stop that prevents said table from being detached from said housing, and,
   a follower that is attached to said table and cooperates with said track to guide said table.

9. The test chamber as recited in claim 8, further comprising a brake coupled to a handle that allows movement of said table when said handle is rotated.

10. The test chamber as recited in claim 8, further comprising a retractable wheel that supports said table when said table is pulled out of said inner chamber.

11. The test chamber as recited in claim 10, wherein said follower is coupled to said wheel by a linkage arm, said track has a step that rotates said follower and moves said wheel between retracted and extended positions.

12. The test chamber as recited in claim 11, further comprising a brake coupled to a handle that allows movement of said table when said handle is rotated.

13. The test chamber as recited in claim 8, wherein said housing includes a door that provides access to said inner chamber, said door having a lock that can be operated from within said inner chamber.

14. The test chamber as recited in claim 13, wherein said lock is coupled to a computer that maintains said lock in a closed position until said inner chamber is in a safe condition.

* * * * *

UNITED STATES PATENT AND TRADEMARK OFFICE
CERTIFICATE OF CORRECTION

PATENT NO.    : 5,513,538
DATED         : May 7, 1996
INVENTOR(S)   : Peter D. Baker et al.

It is certified that error appears in the above-identified patent and that said Letters Patent is hereby corrected as shown below:

Column 1,
Line 66, please delete "access." and insert -- access --.

Column 2,
Line 1, please delete "loadinG" and insert -- loading --.
Line 12, please delete "cheer free" and insert -- chamber frame --.
Line 14, please delete "cheer" and insert -- chamber --.

Column 4,
Line 31, please delete "systemby" and insert -- system by --.
Line 42, please delete "and." and insert -- and --.

Column 5,
Line 35, please delete "cheer" and insert -- chamber. --.

Column 6,
Line 8, please delete "absorbers-" and insert -- absorbers --.

Signed and Sealed this

Twenty-third Day of December, 2003

JAMES E. ROGAN
*Director of the United States Patent and Trademark Office*